G. H. DRAKE & C. PROMENCHENKEL.
DEMOUNTABLE RIM.
APPLICATION FILED OCT. 19, 1912.
1,058,354.
Patented Apr. 8, 1913.
2 SHEETS—SHEET 2.
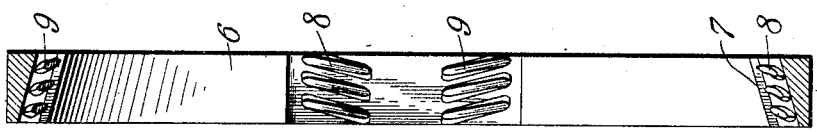
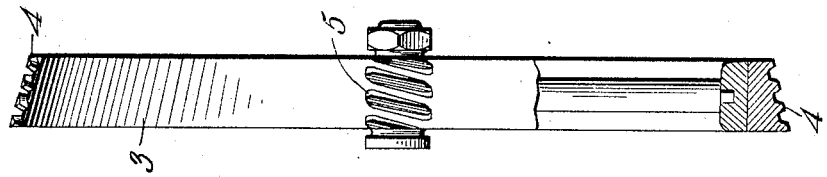
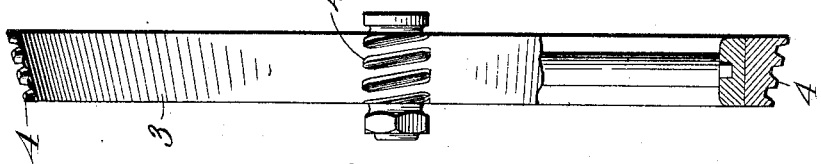
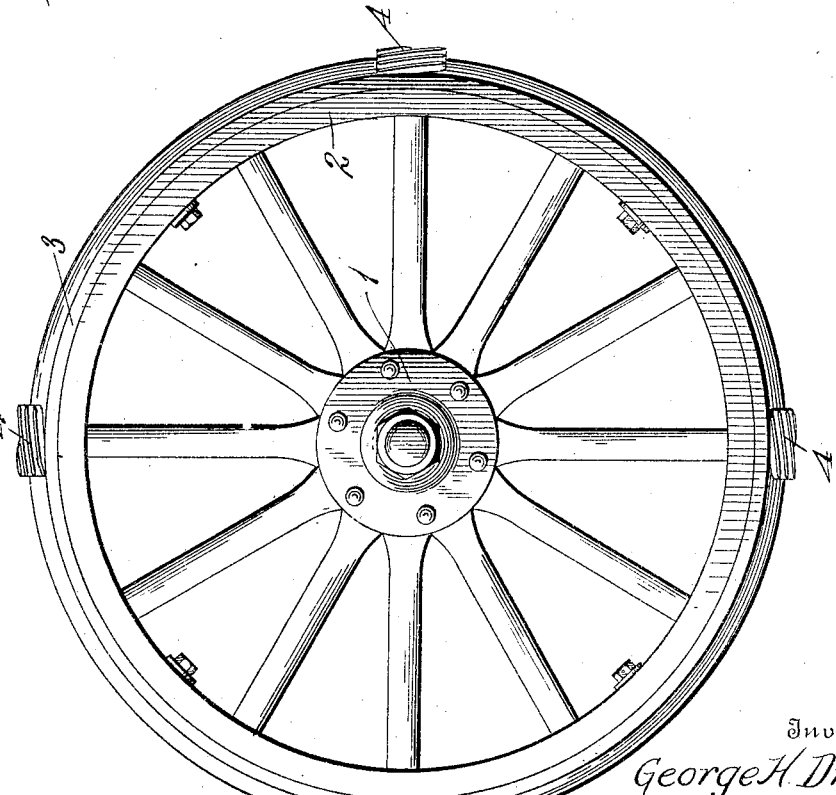

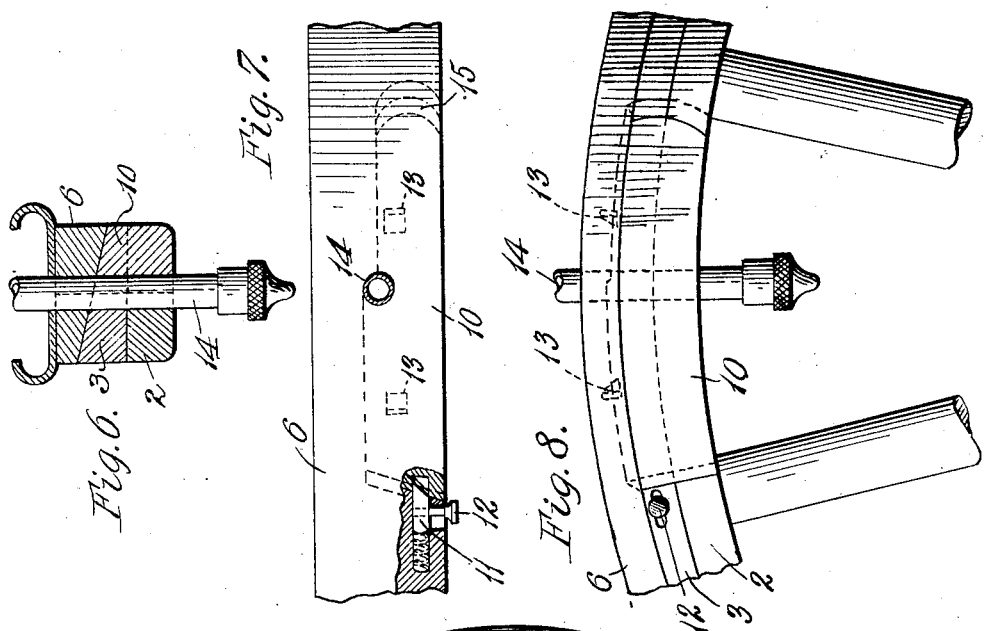

UNITED STATES PATENT OFFICE.

GEORGE H. DRAKE AND CHARLES PROMENCHENKEL, OF DETROIT, MICHIGAN.

DEMOUNTABLE RIM.

1,058,354.   Specification of Letters Patent.   Patented Apr. 8, 1913.

Application filed October 19, 1912.  Serial No. 726,605.

*To all whom it may concern:*

Be it known that we, GEORGE H. DRAKE and CHARLES PROMENCHENKEL, citizens of the United States of America, residing at Detroit, in the county of Wayne and State of Michigan, have invented certain new and useful Improvements in Demountable Rims, of which the following is a specification, reference being had therein to the accompanying drawings.

This invention relates to a demountable rim for a vehicle wheel and to an arrangement thereof whereby it may be quickly applied or removed, the retaining means holding it positively in position when once in place.

The invention consists in the matters hereinafter set forth and more particularly pointed out in the appended claim.

In the drawings, Figure 1 is a view in side elevation of a demountable rim that embodies features of the invention; Fig. 2 is a view in side elevation of a wheel prepared to receive the rim; Fig. 3 is a view partially in elevation and partially in section of the wheel; Fig. 4 is a similar view showing a companion wheel with reverse tire holding members; Fig. 5 is a view in section showing the inner face of the rim and the holding means; and Figs. 6, 7 and 8 are views in detail of a locking member.

As herein shown, a wheel having a conventional nave 1 and felly 2 has a felly band 3 with conical or beveled face. At regular intervals thereon are sections of screwthreads 4 of a proper pitch to draw an applied band with mating threads on to the cone or tapered face. In order that a tire band may be applied to a wheel on either side of a vehicle, the wheels are made in sets and as indicated on Fig. 5, with reverse taper or beveled face, and with reversely disposed threads indicated at 5. A band 6 with the periphery adapted to retain a tire of any preferred design has an inner tapered face 7 mating with the beveled face of the wheels to which it is applied. At regular intervals on the inner face of the band, sets of screwthread segments 8 are applied to register with and engage the threads 4. A second set of segment screwthreads 9 of reverse pitch to the threads 8 are formed on or secured to the inner face of the rim at such distance from the thread 8 that the rim may be applied either to a right or left hand wheel with the threads 4 or 5 lying between the band threads so that a turn of the band in one direction or the other brings the threads into engagement and locks the rim in place. A portion of the felly 2 is cut away to form a slot or seat in which a locking plate 10 may be inserted.

One end portion 15 of the plate is beveled and rounded to engage the recesses in the mating end of the seat and felly. The other end portion is gained or notched to engage a spring latch 11 with a thumb piece 12 by which it may be readily drawn out of engagement. Ratchet projections 13 are oppositely disposed on the inner face of the locking member 10 to engage corresponding recesses in the rim when the latter is fully home on either set of threads. The side of the recesses and corresponding face of the locking member are correspondingly grooved transversely to form a socket for the air tube or nipple 14 to an applied tire.

By this construction a solid rim is obtained which may be readily forced to seat on a wheel and when in position is firmly supported and is positively locked against retrograde movement. By the use of right and left hand threads rims may be so applied to the wheels of a vehicle that under ordinary travel the tendency of the rims is to retain their position, the locking members being sufficient to hold the rims when the vehicle is being backed. As the rim is not cut away, it may be made so as to combine the required strength with lightness.

Obviously, changes in the details of construction may be made without departing from the spirit of our invention and we do not care to limit ourselves to any particular form or arrangement of parts.

What we claim is:—

A demountable rim for a vehicle wheel having an inner beveled face provided at intervals with segments of screwthreads of opposite pitch.

In testimony whereof we affix our signatures in presence of two witnesses.

GEORGE H. DRAKE.
CHARLES PROMENCHENKEL.

Witnesses:
C. R. STICKNEY,
A. M. DORR.

Copies of this patent may be obtained for five cents each, by addressing the "Commissioner of Patents, Washington, D. C."